United States Patent
Cai et al.

(10) Patent No.: US 8,915,442 B2
(45) Date of Patent: Dec. 23, 2014

(54) ARRANGEMENT FOR AND METHOD OF REDUCING SHORT READS IN AN IMAGING READER

(75) Inventors: Joseph Cai, Rocky Point, NY (US); Duanfeng He, South Setauket, NY (US); Dayou Wang, Port Jefferson Station, NY (US); Michelle Wang, Port Jefferson Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 894 days.

(21) Appl. No.: 12/322,134

(22) Filed: Jan. 29, 2009

(65) Prior Publication Data

US 2010/0187314 A1   Jul. 29, 2010

(51) Int. Cl.
*G06K 7/10* (2006.01)
*G06K 5/04* (2006.01)
*G06K 7/14* (2006.01)

(52) U.S. Cl.
CPC ................ *G06K 7/14* (2013.01); *G06K 7/1491* (2013.01)
USPC ................................. 235/462.41; 235/462.08

(58) Field of Classification Search
USPC ............. 235/462.01, 462.11, 462.12, 462.32, 235/462.33, 462.41, 462.08
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,304,786 A | 4/1994 | Pavlidis et al. | |
| 5,446,271 A * | 8/1995 | Cherry et al. | 235/462.1 |
| 5,703,349 A | 12/1997 | Meyerson et al. | |
| 6,761,314 B2 | 7/2004 | Schuessler | |
| 2003/0057282 A1 | 3/2003 | Brandt et al. | |
| 2004/0262395 A1 | 12/2004 | Longacre, Jr. et al. | |
| 2006/0091216 A1 | 5/2006 | Page | |
| 2007/0119944 A1 | 5/2007 | Cai | |
| 2009/0057409 A1 | 3/2009 | Feinstein et al. | |
| 2010/0163625 A1 | 7/2010 | Madej et al. | |

FOREIGN PATENT DOCUMENTS

EP   1693780 A2   8/2006

OTHER PUBLICATIONS

International Search Report and Written Opinion for related International Application No. PCT/US2009/069023 mailed on Apr. 6, 2010.
Non Final Office Action mailed Sep. 3, 2010 in related U.S. Appl. No. 12/317,846, Dariusz J. Madej, filed Dec. 30, 2008.
Final Office Action mailed Feb. 11, 2011 in related U.S. Appl. No. 12/317,846, Dariusz J. Madej, filed Dec. 30, 2008.

(Continued)

*Primary Examiner* — Daniel Hess
(74) *Attorney, Agent, or Firm* — Nong-Qiang Fan

(57) ABSTRACT

An arrangement for, and a method of, enhancing performance of an imaging reader for imaging symbols to be read, include a solid-state imager supported by the reader and having an array of image sensors for capturing return light from a symbol as pixel data over a field of view, and a controller operatively connected to the imager, for mapping a virtual scan line in the field of view, for determining whether the virtual scan line extends entirely over the symbol, for remapping the virtual scan line as a remapped virtual scan line that extends entirely over the symbol upon determining that the virtual scan line extends partially over the symbol, and for decoding the pixel data that lies on the remapped virtual scan line.

17 Claims, 4 Drawing Sheets

(56) References Cited

OTHER PUBLICATIONS

International Preliminary Report on Patentability and Written Opinion for related International Application No. PCT/US2009/069023 mailed on Jul. 14, 2011.

Non Final Office Action mailed Apr. 17, 2013 in related U.S. Appl. No. 12/317,846, Dariusz J. Madej, filed Dec. 30, 2008.

Final Office Action mailed Oct. 25, 2013 in related U.S. Appl. No. 12/317,846, Dariusz J. Madej, filed Dec. 30, 2008.

"IDAutomation," IDAutomation USB Barcode Scanner with Databar, IDAutomation SC5USB (Rev. D) Scanner Programming Manual. Retrieved from the Internet url: http://www.idautomation.com/barcode-scanners/programming-manuals/SC5D-USB-Scanner-Manual.pdf on Jun. 29, 2013, pp. 1-92.

Non-Final Office Action mailed Jun. 19, 2014, in U.S. Appl. No. 12/317,846, Dariusz J. Madej, filed Dec. 30, 2008.

\* cited by examiner

ARRANGEMENT FOR AND METHOD OF REDUCING SHORT READS IN AN IMAGING READER

DESCRIPTION OF THE RELATED ART

Solid-state imaging systems or imaging readers have been used, in both handheld and hands-free modes of operation, to electro-optically read targets, such as one-dimensional bar code symbols, particularly of the Universal Product Code (UPC) type, each having a linear row of bars and spaces spaced apart along a scan direction, as well as two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of photocells or light sensors, which correspond to image elements or pixels in a two-dimensional field of view of the imager, and an imaging lens assembly for capturing return light scattered and/or reflected from the symbol being imaged, and for projecting the return light onto the sensor array to initiate capture of an image of the symbol as pixel data. The imager may be a one- or two-dimensional charge coupled device (CCD) or a complementary metal oxide semiconductor (CMOS) device and includes associated circuits for producing and processing electrical signals corresponding to a one- or two-dimensional array of the pixel data over the field of view. The imager captures the return light under the control of a controller or programmed microprocessor that is operative for processing and decoding the electrical signals into data indicative of the symbol being imaged and read. During operation, the controller selectively energizes selected sensors and, in effect, maps or draws at least one virtual scan line across the symbol, in a manner analogous to a real scan line of a moving laser reader or laser scanner also operative for electro-optically reading such symbols.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Yet, the use of an imaging reader, especially a handheld movable reader, for reading symbols located anywhere within an extended range of working distances relative to the reader has proven to be challenging. An operator cannot see exactly whether a symbol is within the field of view of the array, or whether the entire symbol is traversed by the virtual scan line, during reading. It is not uncommon for the operator to repeatedly move the portable imaging reader in multiple side-to-side, up-and-down, and back-and-forth, directions and repeatedly aim the portable imaging reader at a single symbol several times before an indicator advises the operator that the symbol has been successfully imaged and read, thereby slowing down transaction processing and reducing productivity.

A "short read" occurs when the entire symbol is not traversed by the virtual scan line, in which case, the controller decodes and reports a partial, rather than a full, decoded content of the symbol. For example, if the full decoded content of a symbol is the sequence of numbers "1234567890", then a short read decoding error occurs if the decoded content is only reported as "12345" or "67890".

Bar code symbols have different patterns of bars and spaces that are used to represent different characters. Sets of these patterns are grouped together to form a symbology. There are many types of bar code symbologies, each having their own special characteristics and features. Most symbologies are designed to meet the needs of a specific application or industry. Certain symbologies, e.g., Interleaved 2 of 5, Discrete 2 of 5, IATA 2 of 5 and MSI, are prone to the short read decoding error, primarily because their start/stop characters are considered "weak" and can be confused with their data characters. Without a precise knowledge of where the symbol starts and stops, the virtual scan line can be drawn so that it is tilted relative to a longitudinal or scan direction of the symbol, or can be drawn so that it is short and terminates short of either end region of the symbol. In either case, the virtual scan line does not extend across all the bars and spaces of the entire symbol, thereby leading to the short read decoding error described above.

Heretofore, the short read decoding error problem was addressed by decode restrictions, such as redundancy in which a predetermined number of identical decoded results needed to be obtained before the reading was accepted. The rationale was that a short read would be unlikely to occur if, for example, two or three successive different readings yielded identical decoded results. The short read decoding error problem was also addressed in the art by configuring the controller to expect a certain number of characters for a given symbology, and to reject any reading when the actual number of characters was less than the expected number.

As advantageous as such known imaging readers have been in capturing images and decoding them into identifying data, configuring the controllers with decode restrictions required extra effort and expertise, and not all readers could be so configured. It would be desirable to reduce the short read decoding error problem and the decode restriction burden imposed on the controllers of such imaging readers and to enhance the responsiveness and reading performance of such imaging readers.

SUMMARY OF THE INVENTION

One feature of the present invention resides, briefly stated, in an arrangement for enhancing performance of an imaging reader for imaging symbols to be read. The arrangement includes a solid-state imager supported by the reader and having an array of image sensors for capturing return light from a symbol as pixel data over a field of view. Preferably, the imager is a CCD or a CMOS with a rolling or a global shutter. The array may be one-dimensional, i.e., linear arranged along a single row, or two-dimensional having mutually orthogonal multiple rows and columns. Preferably, the symbol has a plurality of elements of different light reflectivity, e.g., bars and spaces, spaced apart along a scan direction lengthwise of the symbol.

In accordance with this invention, a programmed microprocessor or controller is operatively connected to the imager, for mapping a virtual scan line in the field of view, for determining whether the virtual scan line extends entirely over the symbol, for remapping the virtual scan line as a remapped virtual scan line that extends entirely over the symbol upon determining that the virtual scan line extends partially over the symbol, and for decoding the pixel data that lies on the remapped virtual scan line. Hence, the short read decoding error problem described above is reduced, because the remapped virtual scan line extends across all the bars and spaces of the entire symbol. Decode restrictions, such as redundancy or an expected number of characters for a given symbology, are no longer required. The responsiveness and reading performance of such imaging readers are enhanced.

In one embodiment, the controller is operative for turning the virtual scan line to map a plurality of turned or tilted virtual scan lines, for decoding the pixel data that lies on each of the turned or tilted virtual scan lines, and for selecting the turned or tilted virtual scan line that has the most decoded pixel data. The turned or tilted virtual scan lines are angularly spaced clockwise or counterclockwise apart about a turning axis perpendicular to an image of the symbol. The controller is operative for selecting the turned or tilted virtual scan line by determining which of the turned or tilted virtual scan lines has the most transitions between the bars and the spaces.

In another embodiment, the controller is operative for extending the virtual scan line along the scan direction to map an extended virtual scan line. The controller is operative for analyzing the pixel data to locate opposite end regions of the symbol, and for extending the virtual scan line through the opposite end regions.

In still another embodiment, the controller is operative for determining midpoints of the bars at opposite end regions of the virtual scan line, for mapping a new virtual scan line between the midpoints, and for extending the new virtual scan line through opposite end regions of the symbol.

Another feature of the present invention resides in a method of enhancing performance of an imaging reader for imaging symbols to be read. The method is performed by capturing return light from a symbol as pixel data over a field of view, mapping a virtual scan line in the field of view, determining whether the virtual scan line extends entirely over the symbol, remapping the virtual scan line as a remapped virtual scan line that extends entirely over the symbol upon determining that the virtual scan line extends partially over the symbol, and decoding the pixel data that lies on the remapped virtual scan line.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
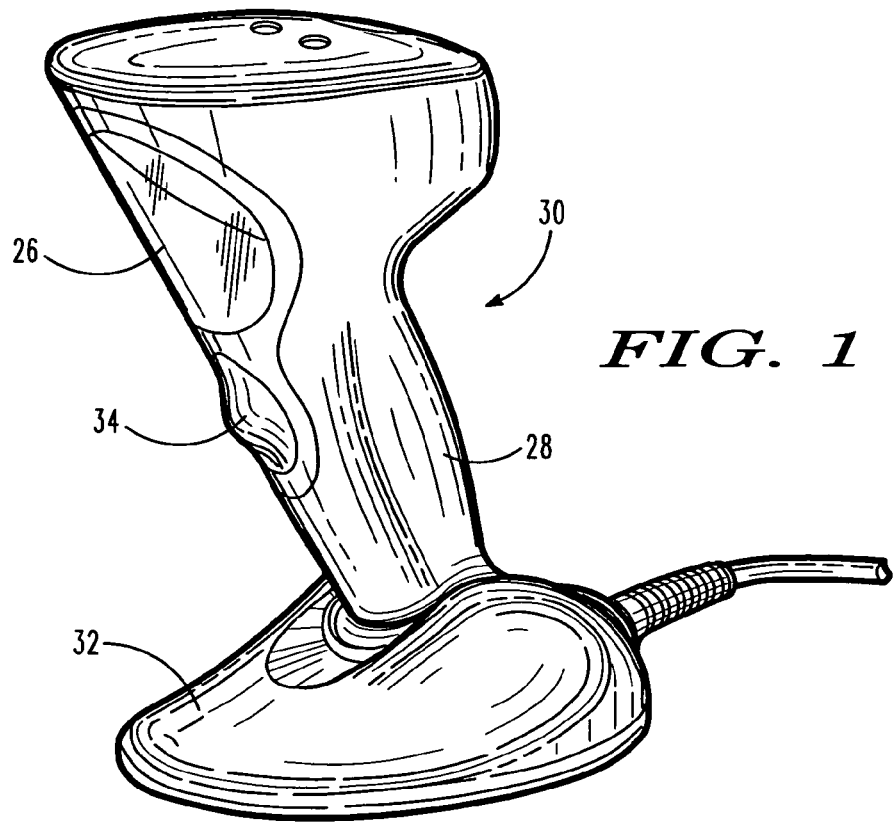
FIG. 1 is a perspective view of a portable imaging reader operative in either a handheld mode, or a hands-free mode, for capturing return light from target symbols.

Reference numeral 30 in FIG. 1 generally identifies an imaging reader having a generally upright window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which the reader is moved, and a trigger 34 is manually depressed to initiate imaging of indicia, especially one- or two-dimensional symbols, to be read at a distance from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
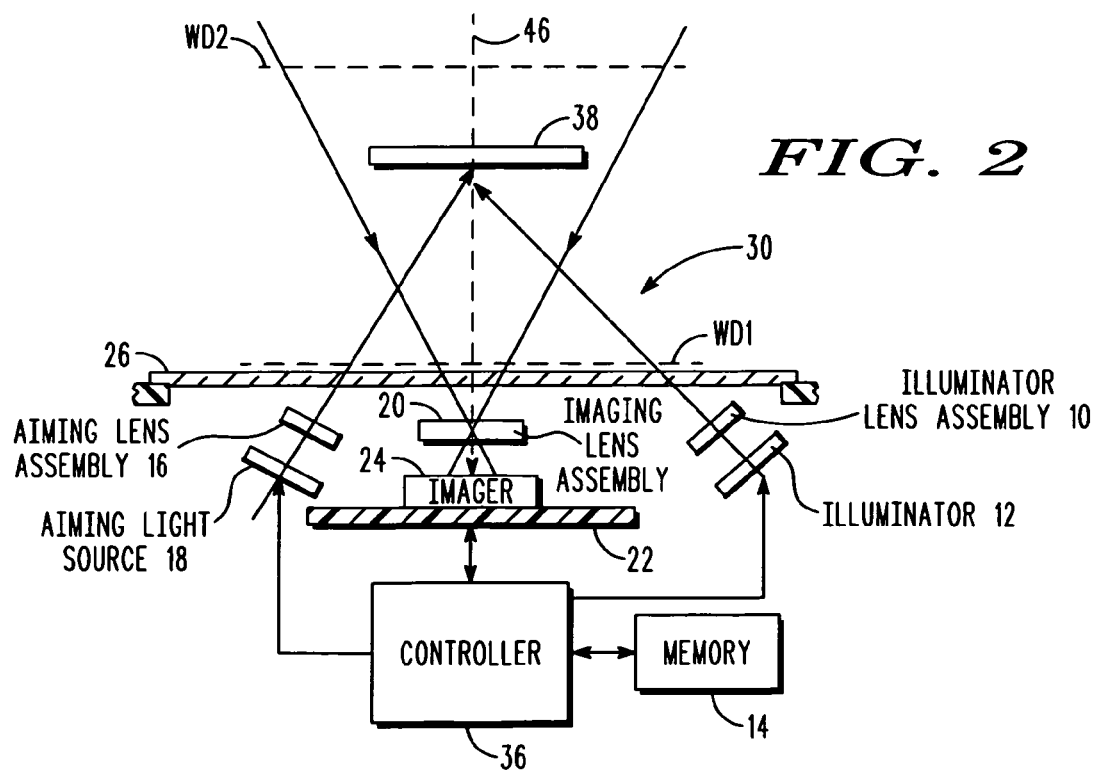
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target or symbol 38 as pixel data over a two-dimensional field of view 60. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., a light emitting diode (LED) or a laser, and an illuminating lens assembly 10 to uniformly illuminate the symbol 38 with an illuminating light having an intensity level over an illumination time period. The light source 12 is preferably pulsed.

An aiming assembly is also mounted in the imaging reader and preferably includes an aiming light source 18, e.g., an LED or a laser, and an aiming lens assembly 16 for generating a visible aiming light pattern on the symbol 38. The aiming pattern is useful to help the operator accurately aim the reader at the symbol 38.

As shown in FIG. 2, the imager 24, the illuminating light source 12 and the aiming light source 18 are operatively connected to a controller or programmed microprocessor 36 operative for controlling the operation of these components. Preferably, the microprocessor 36 includes a decoder for processing the return light from the target symbols, and for decoding the captured target images. A memory 14 is accessible by the controller 36 for storing and retrieving data.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the symbol during an exposure time period. A typical array needs about 16-33 milliseconds to acquire the entire target image and operates at a frame rate of about 30-60 frames per second.

Figure 3:
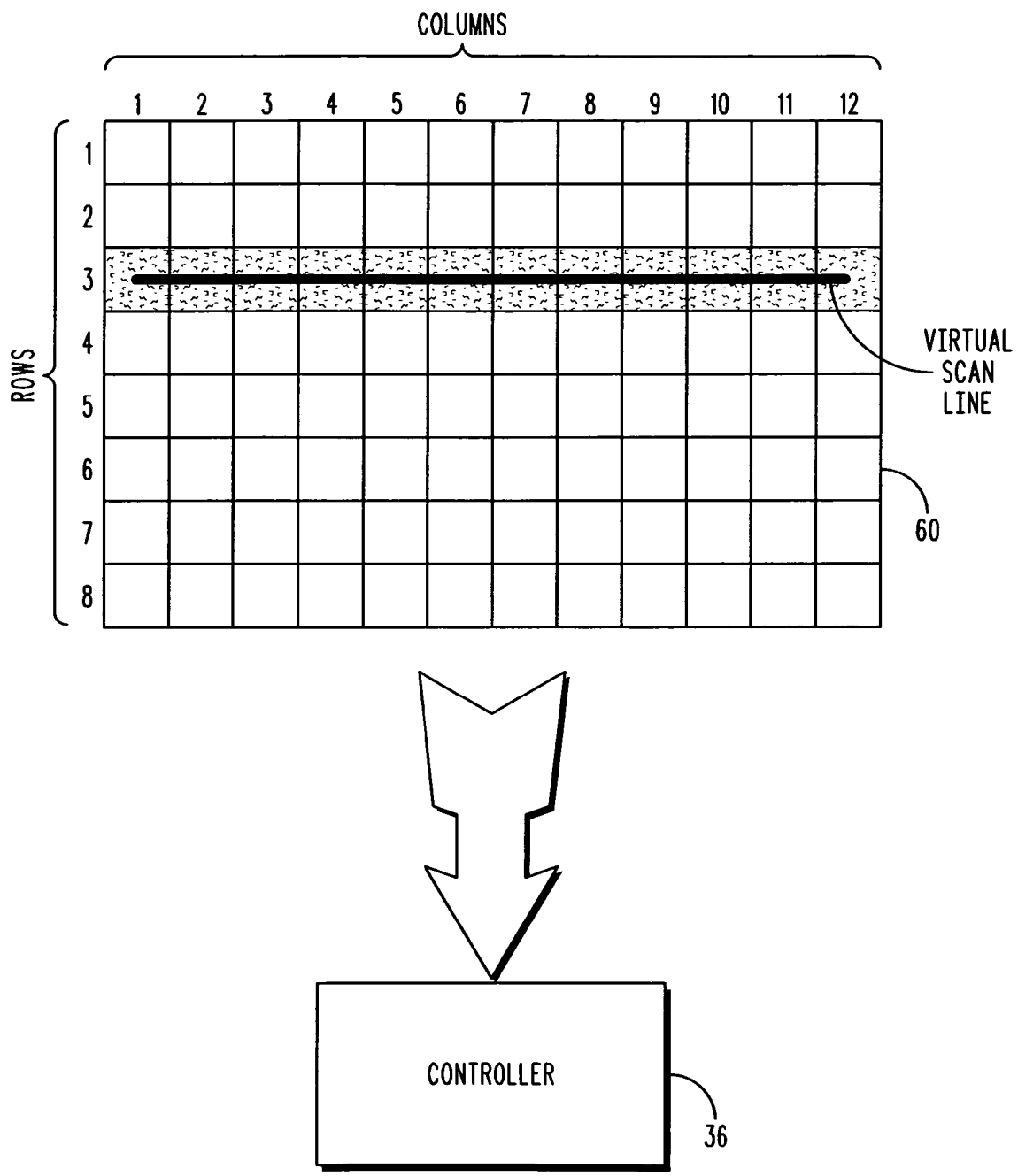
FIG. 3 is a schematic diagram depicting the mapping of a virtual scan line by components of the reader of FIG. 1.

In accordance with this invention, as shown in FIG. 3, the controller 36 is operatively connected to the imager 24, for mapping a virtual scan line in the field of view 60 of the imager. The field of view 60 has been subdivided into eight horizontal rows 1, 2, . . . 8 and twelve vertical columns 1, 2, . . . 12. This is merely exemplary, because more or less rows and columns could be used to configure the field of view. The controller 36 maps the virtual scan line by specifying its end point coordinates, or one of the end point coordinates and a slope of the virtual scan line. Thus, the illustrated virtual scan line has end point coordinates (row 3, column 1) and (row 3, column 12). The virtual scan line is thus characterized by these end point coordinates by which the controller 36 energizes all the sensors in the imager 24 that lie in a line between these end point coordinates. The virtual scan line need not be horizontal as illustrated. Additional virtual scan lines could be used to cover more of the field of view.

Figure 4:
FIG. 4 is a view depicting a tilted virtual scan line on a symbol, which results in a short read decoding error to be prevented.

In operation, the orientation of the symbol 38 relative to the virtual scan line is not precisely known and, as a result, the virtual scan line can be mapped or drawn so that, as shown in FIG. 4, it is tilted or turned relative to a longitudinal or scan direction of the symbol. As illustrated for simplicity, the scan direction is horizontal, and the tilted or turned virtual scan line forms an acute angle with the horizontal. The scan direction could also be vertical, or along a diagonal.

Figure 5:
FIG. 5 is a view depicting a short virtual scan line on a symbol, which also results in a short read decoding error to be prevented.

Also, the virtual scan line can be drawn so that, as shown in FIG. 5, it is short and terminates short of either end region of the symbol. In either case, the tilted or short virtual scan line, as shown in FIGS. 4-5, does not extend across all the bars and spaces that are spaced apart along the scan direction along the entire length of the symbol. This leads to the short read decoding error described above, because the entire symbol is not traversed by the respective virtual scan line, and the controller 36 decodes and reports a partial, rather than a full, decoded content of the symbol.

In further accordance with this invention, the controller 36 is operative for determining whether the virtual scan line extends entirely over the symbol, for remapping the virtual scan line as a remapped virtual scan line that extends entirely over the symbol upon determining that the virtual scan line extends partially over the symbol, and for decoding the pixel data that lies on the remapped virtual scan line. Hence, the short read decoding error problem described above is reduced, because the remapped virtual scan line extends across all the bars and spaces of the entire symbol. Decode restrictions, such as redundancy or an expected number of characters for a given symbology, are no longer required. The responsiveness and reading performance of such imaging readers are enhanced.

Figure 6:
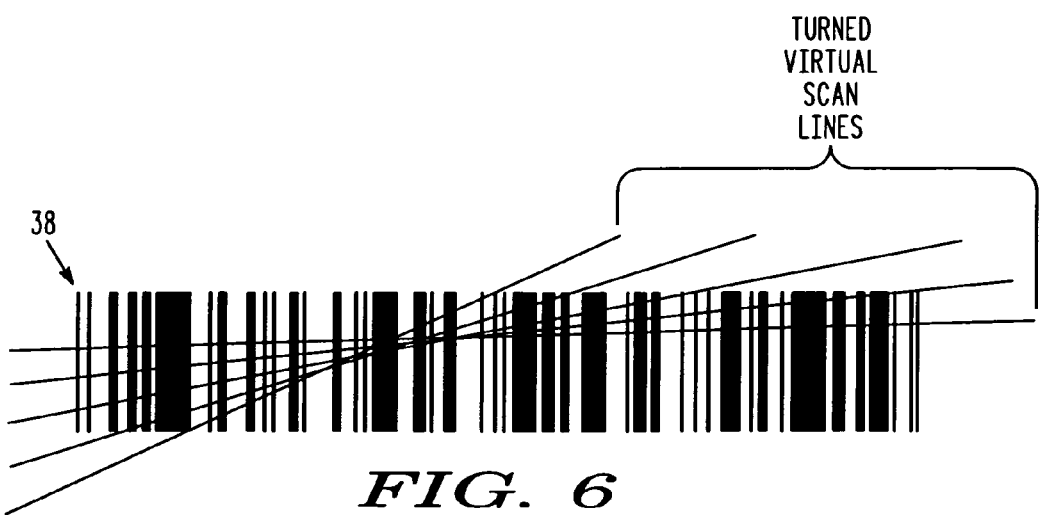
FIG. 6 is a view depicting the turning of the tilted virtual scan line of FIG. 4 on the symbol during prevention of the short read decoding error in accordance with one embodiment of this invention.

In one embodiment, the controller 36 is operative for turning the virtual scan line to map a plurality of turned or tilted virtual scan lines, as depicted in FIG. 6. The controller 36 is operative for decoding the pixel data that lies on each of the turned virtual scan lines, and for selecting the tilted virtual scan line that has the most decoded pixel data. The tilted virtual scan lines are angularly spaced apart by a few steps, clockwise or counterclockwise, about a turning axis perpendicular to an image of the symbol. The controller 36 is operative for selecting the tilted virtual scan line by determining which of the tilted virtual scan lines has the most transitions between the bars and the spaces. In other words, the tilted virtual scan line having the most bar-space transitions is the one that is best aligned with the symbol, because it crosses the most bars and spaces, and the decode resulting from this best aligned virtual scan line is accepted, while the decodes resulting from the other turned virtual scan lines are rejected.

Figure 7:
FIG. 7 is a view depicting an extended virtual scan line on the symbol during prevention of the short read decoding error in accordance with another embodiment of this invention.

In another embodiment, the controller 36 is operative for extending the short virtual scan line of FIG. 5 along the scan direction to map an extended virtual scan line, as shown in FIG. 7. The controller 36 is operative for analyzing the pixel data to locate opposite end regions of the symbol 38, and for extending the virtual scan line through the opposite end regions.

Figure 8:
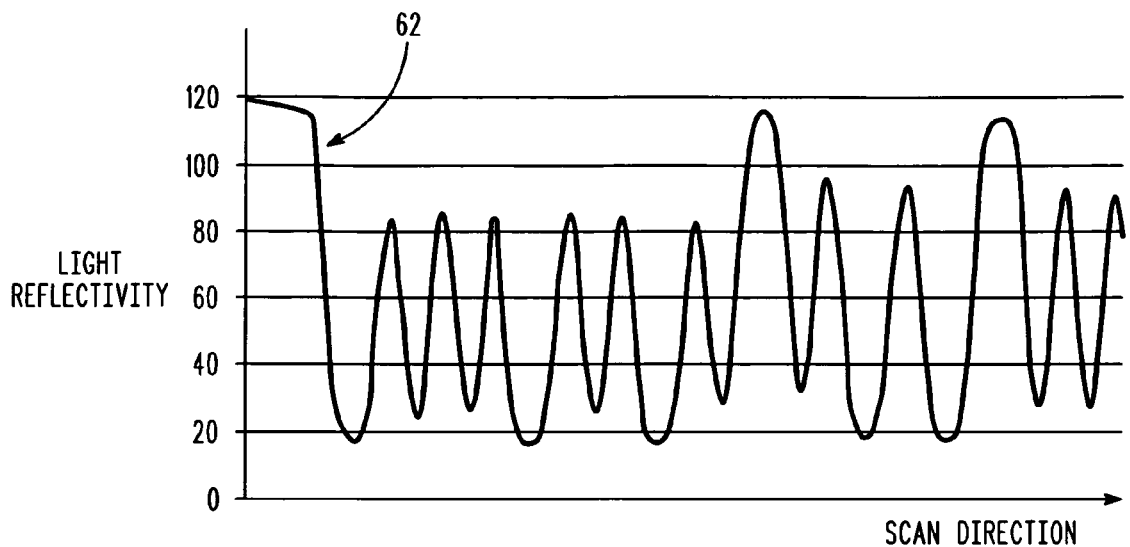
FIG. 8 is a graph depicting an analog electrical signal along a virtual scan line on a symbol.

More specifically, the pixel data analysis can be explained with the aid of FIG. 8, in which light reflectivity is plotted against the scan direction. FIG. 8 depicts an analog electrical signal generated by the imager 24 along the virtual scan line. Each peak represents a space of the symbol 38, and each valley represents a bar of the symbol 38. The height and the widths of each space and bar can be readily determined by the controller, as can the width of the narrowest bar or space, which is known as the "module". The virtual scan line of FIG. 5 can be extended in opposite directions for an integral number of modules. Then, the controller 36 examines the signal waveform and determines that, in the left region 62, the light reflectivity indicates that there are no bars or spaces in the left region 62, thereby indicating that the symbol has ended. A similar analysis occurs for the non-illustrated right region of the waveform. The virtual scan line of FIG. 5 is extended through the end regions of the symbol, thereby insuring that all the bars and spaces will have been crossed by the extended virtual scan line.

Figure 9:
FIG. 9 is a view depicting an extended virtual scan line on the symbol during prevention of the short read decoding error in accordance with still another embodiment of this invention.

In a variant, the controller 36 is operative for determining midpoints of the bars at opposite end regions of the virtual scan line, for mapping a new virtual scan line between the midpoints, and for extending the new virtual scan line through opposite end regions of the symbol. Thus, as shown in FIG. 9, the heights of the first and last bars of the virtual scan line is determined by the controller 36, and then the midpoints of the first and last bars are calculated. Then, the remapped virtual scan line is drawn between the midpoints. Then, the remapped virtual scan line is extended in the manner described above in connection with FIG. 7.

All virtual scan lines generated herein are derived from the captured images of the symbols. All decodes are derived from the virtual scan lines. If a decoded symbology is susceptible to a short read, then the location and orientation of the virtual scan line relative to the symbol are analyzed, and an appropriate action taken. If it is found that a virtual scan line can be remapped to cross more bars and spaces, by either turning or extending the virtual scan line, then the remapped virtual scan line is deemed to better represent the entire symbol, and the decode from the original tilted or short virtual scan line is discarded. If it is found that one end region of the virtual scan line is too close to an edge of the captured image, then the decode may also be rejected due to an insufficient margin area.

It will be understood that each of the elements described above, or two or more together, also may find a useful application in other types of constructions differing from the types described above.

While the invention has been illustrated and described as an arrangement for, and a method of, enhancing performance of an imaging reader by resisting short reads, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for enhancing performance of an imaging reader for imaging symbols to be read, comprising:
    a solid-state imager supported by the reader and having an array of image sensors for capturing return light from a symbol as pixel data over a field of view, wherein the symbol is a one-dimensional symbol that has a plurality of bars and spaces spaced apart along a scan direction; and
    a controller operatively connected to the imager, for mapping a virtual scan line in the field of view, for remapping the virtual scan line to a remapped virtual scan line, and for preventing any shot read by validating decoded information obtained from decoding the pixel data that lies on the virtual scan line only after a determination that the remapped virtual scan line does not have more bar-space transitions than the virtual scan line.

2. The arrangement of claim 1, wherein the controller is operative for turning the virtual scan line to map a plurality of turned virtual scan lines, for decoding the pixel data that lies on each of the turned virtual scan lines, and for selecting the turned virtual scan line that has the most decoded pixel data.

3. The arrangement of claim 2, wherein the symbol has a plurality of bars and spaces spaced apart along a scan direction; and wherein the turned virtual scan lines are angularly spaced apart about a turning axis perpendicular to an image of the symbol.

4. The arrangement of claim 3, wherein the controller is operative for successively turning the virtual scan line clockwise or counterclockwise about the turning axis.

5. The arrangement of claim 3, wherein the controller is operative for selecting the turned virtual scan line by determining which of the turned virtual scan lines has the most transitions between the bars and the spaces.

6. The arrangement of claim 1, wherein the controller is operative for extending the virtual scan line along the scan direction to map an extended virtual scan line.

7. The arrangement of claim 6, wherein the controller is operative for analyzing the pixel data to locate opposite end regions of the symbol, and for extending the virtual scan line through the opposite end regions.

8. The arrangement of claim 1, wherein the symbol has a plurality of bars and spaces spaced apart along a scan direction; and wherein the controller is operative for determining midpoints of the bars at opposite end regions of the virtual scan line, for mapping a new virtual scan line between the midpoints, and for extending the new virtual scan line through opposite end regions of the symbol.

9. An arrangement for enhancing performance of an imaging reader for imaging symbols to be read, comprising:
    means for capturing return light from a symbol as pixel data over a field of view, wherein the symbol is a one-dimensional symbol that has a plurality of bars and spaces spaced apart along a scan direction; and
    means for determining whether the virtual scan line extends across all the bars and spaces of the symbol, means for remapping the virtual scan line to a remapped virtual scan line, and for preventing any shot read by validating decoded information obtained from decoding the pixel data that lies on the virtual scan line only after a determination that the remapped virtual scan line does not have more bar-space transitions than the virtual scan line.

10. A method of enhancing performance of an imaging reader for imaging symbols to be read, comprising the steps of:
    capturing return light from a symbol as pixel data over a field of view, wherein the symbol is a one-dimensional symbol that has a plurality of bars and spaces spaced apart along a scan direction;
    mapping a virtual scan line in the field of view;
    remapping the virtual scan line to a remapped virtual scan line;
    determining whether the remapped virtual scan line has more bar-space transitions than the virtual scan line; and
    validating decoded information obtained from decoding the pixel data that lies on the virtual scan line only if the remapped virtual scan line does not have more bar-space transitions than the virtual scan line.

11. The method of claim 10, and turning the virtual scan line to map a plurality of turned virtual scan lines, decoding the pixel data that lies on each of the turned virtual scan lines, and selecting the turned virtual scan line that has the most decoded pixel data.

12. The method of claim 11, and configuring the symbol with a plurality of bars and spaces spaced apart along a scan direction; and angularly spacing the turned virtual scan lines apart about a turning axis perpendicular to an image of the symbol.

13. The method of claim 12, and successively turning the virtual scan line clockwise or counterclockwise about the turning axis.

14. The method of claim 12, and selecting the turned virtual scan line by determining which of the turned virtual scan lines has the most transitions between the bars and the spaces.

15. The method of claim 10, extending the virtual scan line along the scan direction to map an extended virtual scan line.

16. The method of claim 15, and analyzing the pixel data to locate opposite end regions of the symbol, and extending the virtual scan line through the opposite end regions.

17. The method of claim 10, and configuring the symbol with a plurality of bars and spaces spaced apart along a scan direction; and determining midpoints of the bars at opposite end regions of the virtual scan line, mapping a new virtual scan line between the midpoints, and extending the new virtual scan line through opposite end regions of the symbol.

\* \* \* \* \*